(12) United States Patent
Bostrom

(10) Patent No.: US 7,379,941 B2
(45) Date of Patent: May 27, 2008

(54) METHOD FOR EFFICIENTLY CHECKING COVERAGE OF RULES DERIVED FROM A LOGICAL THEORY

(75) Inventor: Henrik Bostrom, Lidingo (SE)

(73) Assignee: Compumine AB, Uppsala (SE)

( * ) Notice: Subject to any disclaimer, the term of this patent is extended or adjusted under 35 U.S.C. 154(b) by 843 days.

(21) Appl. No.: 10/605,190

(22) Filed: Sep. 13, 2003

(65) Prior Publication Data

US 2005/0060320 A1     Mar. 17, 2005

(51) Int. Cl.
    *G06F 17/30* (2006.01)
(52) U.S. Cl. ............ 707/101; 707/3; 707/10; 706/20; 706/46; 704/4
(58) Field of Classification Search ......... 705/26, 705/10; 718/105; 706/12, 20, 46; 707/3, 707/10, 101, 102, 200, 205; 704/4
See application file for complete search history.

(56) References Cited

U.S. PATENT DOCUMENTS

| 5,627,945 | A * | 5/1997 | Cohen ................. 706/12 |
| 6,269,353 | B1 * | 7/2001 | Sethi et al. ............ 706/20 |
| 6,519,580 | B1 * | 2/2003 | Johnson et al. ......... 706/47 |
| 6,871,186 | B1 * | 3/2005 | Tuzhilin et al. ........ 706/20 |
| 2004/0093261 | A1 * | 5/2004 | Jain et al. ............ 705/10 |

* cited by examiner

*Primary Examiner*—Shahid Alam
*Assistant Examiner*—Rezwanul Mahmood
(74) *Attorney, Agent, or Firm*—Rolf Fasth; Fasth Law Offices

(57) ABSTRACT

The method is used in a computer and includes the steps of providing a logical theory that has clauses. A rule is generated that is a resolvent of clauses in the logical theory. An example is retrieved. A proof tree is generated from the example using the logical theory. The proof tree is transformed into a database of a coverage check apparatus. The rule is converted into a partial proof tree that has nodes. The partial proof tree is transformed into a database query of the coverage check apparatus. The query is executed to identify tuples in the database that correspond to the nodes of the partial proof tree.

10 Claims, 10 Drawing Sheets

Fig.3

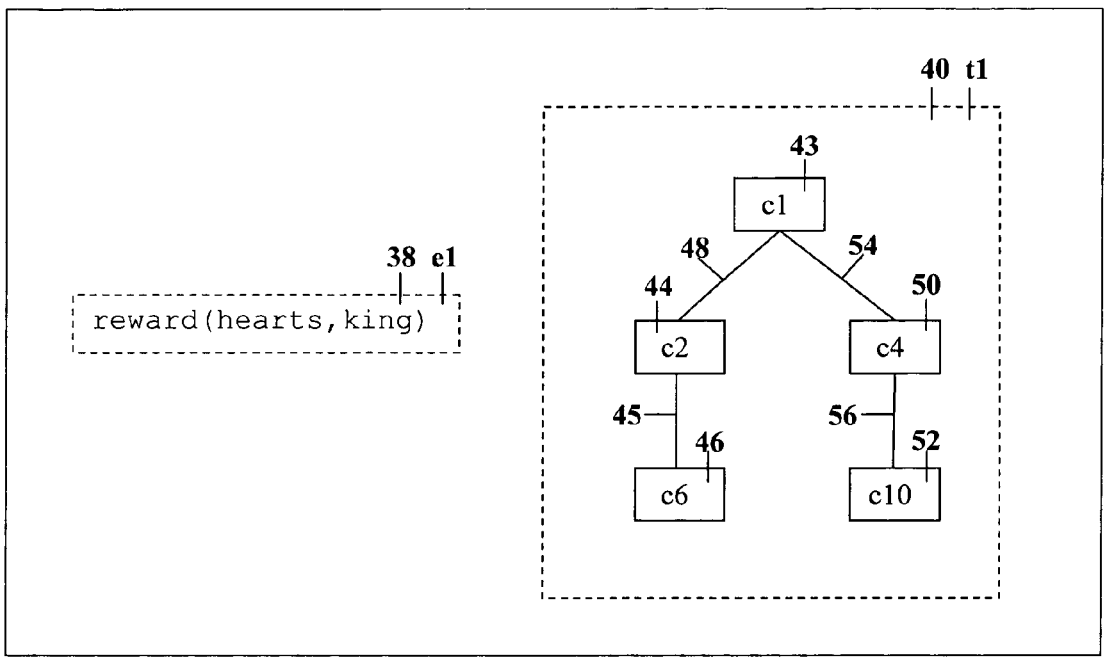

Fig.4

Input:
  an example label e,
  a proof tree T,
  proof tree label t,
  a set of database tables D
Output:
  a set of database tables D For each sequence $n_0, ..., n_k$ in the tree T, where $n_0$ is the root of T and $n_{i+1}$ is a child of $n_i$ in T, for all $0 \leq i < k$, do
  Let n be a table name obtained by a function from the sequence of pairs $(c_0,1), (c_1,s_1), ..., (c_k, s_k)$, where $c_i$ is the clause used in node $n_i$, for $0 \leq i \leq k$ and where $s_i$ is the $s_i$:th child of $n_{i-1}$, for $0 < i \leq k$.
  If there is no table named n in D, create such a table with name n and two fields, Example and Tree, and add the table to D.
  Add the tuple Example = e and Tree = t to the table named n.

Fig.5

Table c1

| Example | Tree |
|---|---|
| e1 | t1 |

Table c1_1_c2

| Example | Tree |
|---|---|
| e1 | t1 |

Table c1_1_c2_1_c6

| Example | Tree |
|---|---|
| e1 | t1 |

Table c1_2_c4

| Example | Tree |
|---|---|
| e1 | t1 |

Table c1_2_c4_1_c10

| Example | Tree |
|---|---|
| e1 | t1 |

Fig.6

```
(r1) reward(Color,Value):- red(Color), face(Value).
```

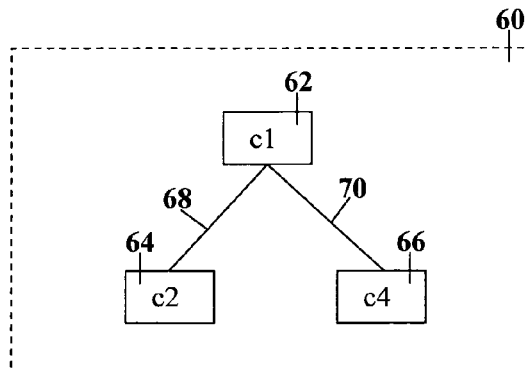

Fig. 7

Input:
   a partial proof tree T,
   an example label e,
Output:
   a database query Q Let D be the empty set
Let C be an empty conjunction
For each sequence $n_0, ..., n_k$ in the partial proof tree T, where $n_0$ is the root of T and $n_{i+1}$ is a child of $n_i$ in T, for all $0 \leq i < k$, do
  Let n be a table name obtained by a function from the sequence of pairs
  $(c_0,1), (c_1,s_1), ..., (c_k, s_k)$, where $c_i$ is the clause used in node $n_i$, for $0 \leq i \leq k$
    and where $s_i$ is the $s_i$:th child of $n_{i-1}$, for $0 < i \leq k$.
  Add n to D
  Add the conjunct n.Example = e to C
Let C' = C
For each conjunct $n_i$.Example = e in C = (n0.Example = e) AND ... AND $(n_m$.Example = e), where i < m, do
  Add the conjunct $n_i$.Tree = $n_{i+1}$.Tree to C'
Let Q = 'SELECT * FROM' + D + 'WHERE' + C'

Fig. 8

```
SELECT *
    FROM c1_1_c2, c1_2_c4         —74
    WHERE c1_1_c2.Example = 'e1'  —76
    AND c1_2_c4.Example = 'e1'    —80
    AND c1_1_c2.Tree = c1_2_c4.Tree  —82
```

```
SELECT *
FROM c1_1_c2, c1_2_c4
WHERE c1_1_c2.Example = 'e1'
AND c1_2_c4.Example = 'e1'
```
84

(s1) reward(Weight,Length):- 85
　　　　　　　　split_number(Weight), 87
　　　　　　　　split_number(Length). 89

```
(r2)  reward(Weight,Length):-
                Weight > 3,
                split_number(Weight),
                Length =< 8.2,
                split_number(Length).
```
88

Table s1

| Example | Tree |
|---------|------|
| e2 | t2 |

Table s1_1

| Example | Tree | split_number |
|---------|------|--------------|
| e2 | t2 | 5 |

Table s1_2

| Example | Tree | split_number |
|---------|------|--------------|
| e2 | t2 | 4 |

Fig. 15

SELECT *

FROM s1_1, s1_2

WHERE s1_1.Example = 'e2'

AND s1_1.split_number > 3

AND s1_2.Example = 'e2'

AND s1_2.split_number <= 8.2

AND s1_1_c2.Tree = c1_2_c4.Tree

METHOD FOR EFFICIENTLY CHECKING COVERAGE OF RULES DERIVED FROM A LOGICAL THEORY

BACKGROUND OF INVENTION

The invention relates to a method for learning systems, and in particular, to learning systems that generate rules by derivation from a logical theory.

Several methods for rule induction are known in the art. Common for these methods is that a set of logical rules are generated from a set of examples, where each example has been given a label, which can either be a categorical value or a numeric value. Each logical rule consists of a condition part that in turn consists of a set of logical tests as well as a conclusion part, which assigns a value for the label. For example, the condition part may be that the number of atoms must exceed the numerical value five and the molecule weight must not be less than 100 to generate a positive class. The examples may include attributes, such as molecule weight, that correspond to the condition part of the logical rule. One of the most common techniques for rule induction is known as decision tree induction, which generates a set of hierarchically organized rules, where none of the rules overlap (i.e., the conditions of two different rules are mutually exclusive). Examples of such techniques are ID3 and CART. Other techniques, such as covering or separate-and-conquer, may generate overlapping rules. Examples of such techniques are CN2 and RIPPER.

Most techniques for rule induction allow examples to be represented as fixed-length attribute-value vectors, and the conditions to consist of simple tests that, for example, checks whether a particular attribute has a particular value, or whether the value is below or above a particular threshold. Some techniques also allow examples to be represented by arbitrary logical terms, including lists and trees, and conditions to consist of arbitrary logical literals such as tests that involve an arbitrary number of variables using arbitrarily defined predicates. Such techniques are studied primarily in a research field known as inductive logic programming and examples of such techniques are FOIL and PROGOL.

One method for rule induction is to use a logical theory from which rules are derived by using an inference procedure known as resolution. During the generation of rules to be included in the final hypothesis, a large number of candidate rules are evaluated, which involves checking for a set of training examples, which of these fulfill the conditions of the candidate rules. After the final hypothesis has been generated, it is usually applied to examples not included in the set of training examples, which again involves checking whether or not the conditions of the rules are fulfilled for each example. This is a very cumbersome process, in which complex proof trees may have to be generated repeatedly for each example. In both cases, minimizing the amount of time required to perform these tests can be of high importance. There is a need for a more effective process that does not require the repeated generation of proof trees for the examples.

The present invention provides a solution to this problem and is a method and an apparatus for efficiently checking whether or not the conditions of a rule derived by resolution from a logical theory are fulfilled by an example. The apparatus consists of the following three modules:

i) A module for generating a database from proof trees that have been constructed from the examples using the logical theory;

ii) A module for generating database queries from rules that have been derived from the logical theory; and iii) A module for querying the database with the queries obtained from the rules.

More particularly, the method is used in a computer and includes the steps of providing a logical theory that has clauses. A rule is generated that is a resolvent of clauses in the logical theory. An example is retrieved. A proof tree is generated from the example using the logical theory. The proof tree is transformed into a database of a coverage check apparatus. The rule is converted into a partial proof tree that has nodes. The partial proof tree is transformed into a database query of the coverage check apparatus. The query is executed to identify tuples in the database that correspond to the nodes of the partial proof tree. In this way, the database of pre-existing examples may be investigated to determine if a rule covers a pre-existing example, that are associated with the same logical theory, so there is no need to recreate complicated proof trees for the examples.

BRIEF DESCRIPTION OF DRAWINGS

FIG. 3 is a schematic flowchart of a proof tree of the method of the present invention;

FIG. 4 is a sequence for transforming proof trees into database tables according to the method of the present invention;

FIG. 5 is a group of database tables generated from a proof tree according to the method of the present invention;

FIG. 6 is a schematic flowchart of a derived rule according to the method of the present invention;

FIG. 7 is a sequence for transforming a rule into a database query according to the method of the present invention;

FIG. 8 is a database query generated according to the method of the present invention;

FIG. 10 is a database query generated assuming a single proof tree according to the method of the present invention;

FIG. 11 is a logical theory of the method of the present invention;

FIG. 14 is a group of database tables generated from a proof tree according to the method of the present invention; and FIG. 15 is a database query generated from a rule according to the method of the present invention.

DETAILED DESCRIPTION

With reference to FIGS. 1-15 and the description below, the method of the present invention is described with reference to particular embodiments of logical theories and database systems used in connection with a computer. The present invention, however, is not limited to any particular syntax for logical theories and types of database system, nor limited by the examples described herein. Therefore, the description of the embodiments that follows is for purposes of illustration and not as a limitation.

Figure 1:
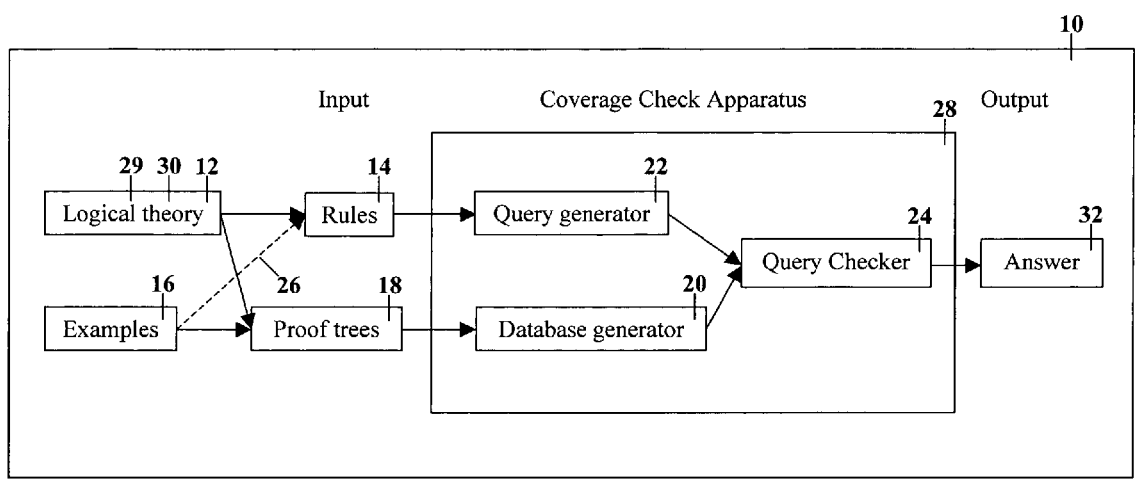
FIG. 1 is an overview schematic flowchart of the method of the present invention.

One important feature of the method of the present invention is that the database of pre-existing examples is investigated to determine if a rule covers a pre-existing example, that is associated with the same logical theory, so there is no need to recreate complicated proof trees for the examples and the rules. FIG. 1 provides an overview of a coverage check procedure 10 of the apparatus of the present invention. The procedure has a coverage check apparatus 28 that takes as input a set of rules 14 that are resolvents of clauses 29, such as Horn clauses, in a logical theory 12 and a set of proof trees 18 that have been generated from pre-existing examples 16 that consists of atoms using the logical theory 12. In other words, the theory 12 may be used to describe which possible rules that may be created. The logical theory may function as a type of a grammar for the rules.

The procedure 10 may be used to investigate for each rule 14 and each example 16 whether or not the rule 14 covers the example 16. It then investigates whether a condition part of the rule 14 is satisfied by the example 16. The method/procedure 10 of the present invention does this by transforming the proof trees 18 into database tables of a database generator 20, by transforming the rules 14 into database queries of a query generator 22 and finally by checking in a query checker 24 whether or not the queries 22 produce empty result sets with respect to the database tables 20 to finally produce an answer 32 as the output of the apparatus 28. If a matching pre-existing example is found that is covered by the rule, there is no need to re-create the proof trees. The method and modules of the apparatus are described below.

The method may be simplified in case each example has at most one proof tree. Finally, the procedure can be extended to handle the situation when conditions of the generated rules are not only derived from the logical theory but also contain terms derived from the examples, as indicated by a dotted line 26 in FIG. 1.

When transforming proof trees 18 into the database tables 20 of the apparatus 28, it is assumed that all possible proof trees 18 for each example 16 have been generated using the given logical theory 12, and that each example 16 and proof tree 18 has been given a unique label.

Figure 2:
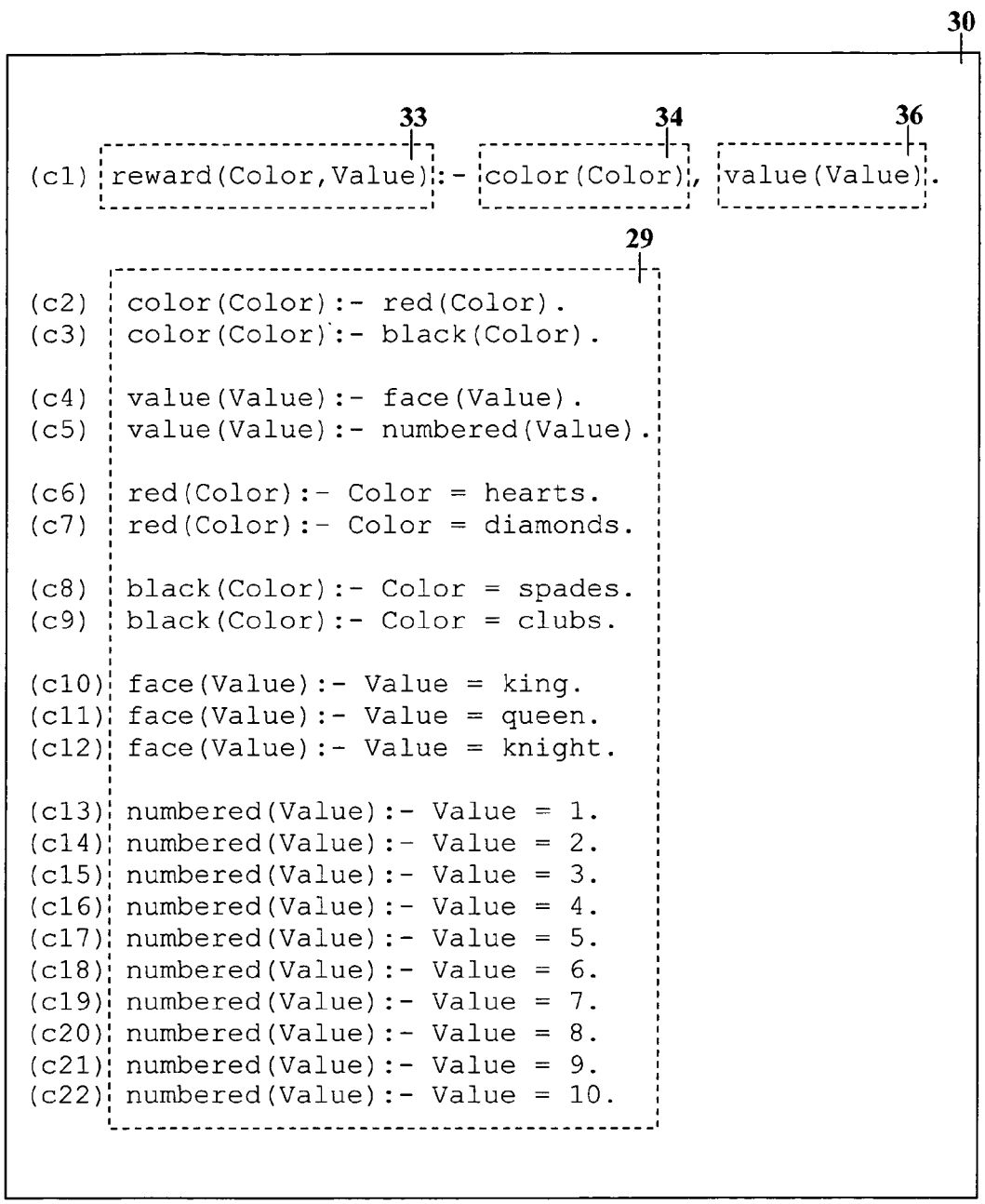
FIG. 2 is a rule sequence of a logical theory of the method of the present invention.

FIG. 2 gives an example of a logical theory 30 using a standard prolog syntax that concerns the domain of playing cards. The theory 30 may describe the pre-existing examples with the help of rules that may include hierarchical relations. The theory 30 also specifies which attributes are included in the pre-existing examples. A clause c1 defines a predicate reward 33 that has two arguments i.e. Color with the associated body literal color 34 and Value with the associated body literal value 36. A specific example is covered by a logical theory if it is an instance of a defined predicate, and if all corresponding body literals are covered by the logical theory, as described below. The rule or clause c1 states that something that has the predicate name reward and two arguments is covered by the logical theory, if the corresponding instances of the predicates color and value are covered by the logical theory. A clause c2 states that red is a color and clause c3 states that black is a color. A clause c4 states that face is a value and clause c5 states that numbered is a value. Clauses c6 and c7 state that hearts and diamonds are a color that is red. In other words, hearts or diamonds has a color that is red. Clauses c8 and c9 state that spades and clubs are a color that is black. In other words, spades or clubs c9 has a color that is black. Clauses c10, c11, c12 state that king, queen and knight are values that are faces. Clauses c13, . . . , and c22 state that 1, . . . and 10 are values that are numbers.

FIG. 3 shows that logical theory 30 covers an example 38, such as reward (hearts, king). A proof tree 40, also labeled t1, can be derived from the logical theory 30 and the example 38, also labeled e1. The proof tree 40 has a first base node 43 and nodes 44, 46 in a first leg 48 and nodes, 50, 52 in a second leg 54. The proof tree may show how a specific example is covered by the logical theory. In other words, the proof tree 40 shows that example 38 is covered by the logical theory 30. More particularly, FIG. 3 shows the only possible proof tree 40 for the example 38, given the logical theory 30. It should be noted that the proof trees do not include proofs of predicates whose definitions are built into the system for generating proof trees, such as =/2 in the example.

FIG. 4 is a sequence 41 that has an example labeled e, a proof tree T, a proof tree labeled t and a set of database tables D as input. An output with the updated database tables D that includes tuples containing the examples e and tree t is generated. The set of database tables, which initially is an empty set, may be updated using the process sequence shown in FIG. 4. The sequence is called once for each proof tree that has been generated, and the input to each call is, besides the proof tree and its label, the example label and the database tables generated by preceding calls to the sequence. In this way, the information of the proof trees is stored in database tables.

FIG. 5 shows a table group 42 including the database tables 42a, 42b, 42c, 42d, 42e generated from calling the sequence 41 with the proof tree 40, labeled t1 in FIG. 5, together with the example 38, labeled e1 in FIG. 5, and an initially empty set of tables. Each node of the proof tree 40 results in a database table and the path to each node is used to form the name of the database table. The example e1 was used to create the node 43 of the proof tree t1. Some examples may generate more than one proof tree. The example e1 was also used to create the node 44 of the same proof tree t1 and the path is from node 43 via a first leg 48 to the node 44. The node 46 continues from the node 44 via a first leg 45. Similarly, the example e1 was used to create the node 52 and the path is from the node 43 via a second leg 54 to the node 50 and then via a first leg 56 to the node 52.

When transforming rules into database queries, it is assumed that each rule is generated by resolving upon a clause (c1, c2 etc.) in the logical theory. The generated rule can be represented by a tree, that may here be called partial proof tree, where the clause that is resolved upon appears in the root of the tree, and the $i^{th}$ child of a node in the tree shows by what rule the $i^{th}$ literal obtained from the clause at the node should be resolved upon.

FIG. 6 shows a rule 58 or rule (r1) obtained by resolving upon the first clause (c1) in the logical theory 30 shown in FIG. 2, together with a corresponding partial proof tree 60. The partial proof tree 60 has nodes 62, 64 and 66 and a first leg 68 and a second leg 70. The rule 58 is more specific or narrower than the clause c1 and includes the limitations of the clauses c2 and c4. The argument color may be replaced by red and the argument value may be replaced by face. All black cards and red numbered cards are not included in the rule 58. It may then be possible to search for examples that are covered by the rule 58. In other words, a search is conducted for examples for which proof trees can be generated using the rule 58.

It is often expensive to develop the proof trees and one important feature of the present invention is that it is only necessary to build up the proof trees once because the proof trees are saved as database tables for future use.

A database query 72 is generated in the query generator 22, shown in FIG. 1, from the partial proof tree 60, together with the label of an example, as outlined in FIG. 7. It should be noted that the function for generating table names from a sequence of a clause and child number pairs has to be identical to the one used by the sequence in FIG. 3.

FIG. 8 shows the query 72 generated from the partial proof tree 60 shown in FIG. 6 for the example label (e1). The query 72 may be used to find out or test whether rule 58 covers a pre-existing example by matching the information of the partial proof tree 60 with suitable database tables.

Once the proof trees of an example have been transformed into database tables, and a rule has been used to generate a database query with reference to the label of the example, the coverage check is performed by executing the query with regard to the database tables. In case no solution is found (this includes the case when the query refers to a table that does not exist), it is concluded that the rule does not cover the example. In case the solution set is non-empty, it is concluded that the rule does cover the example.

For example, as best shown in FIG. 8, the query 72 has a FROM clause 74 that corresponds to the partial proof tree 60 and which refers to the database tables 42b and 42d, a WHERE clause 76 and AND clauses 80, 82. Both table 42b and table 42d contain tuples with example e1 and the same proof tree, as tested by the clauses 76, 80 and 82, so rule 58 covers example e1.

In case each example has at most one proof tree, the above procedure can be simplified. The tuples that are added to the tables in the process sequence shown in FIG. 4 do only require the Example field so that the Tree field can be left out.

Figure 9:
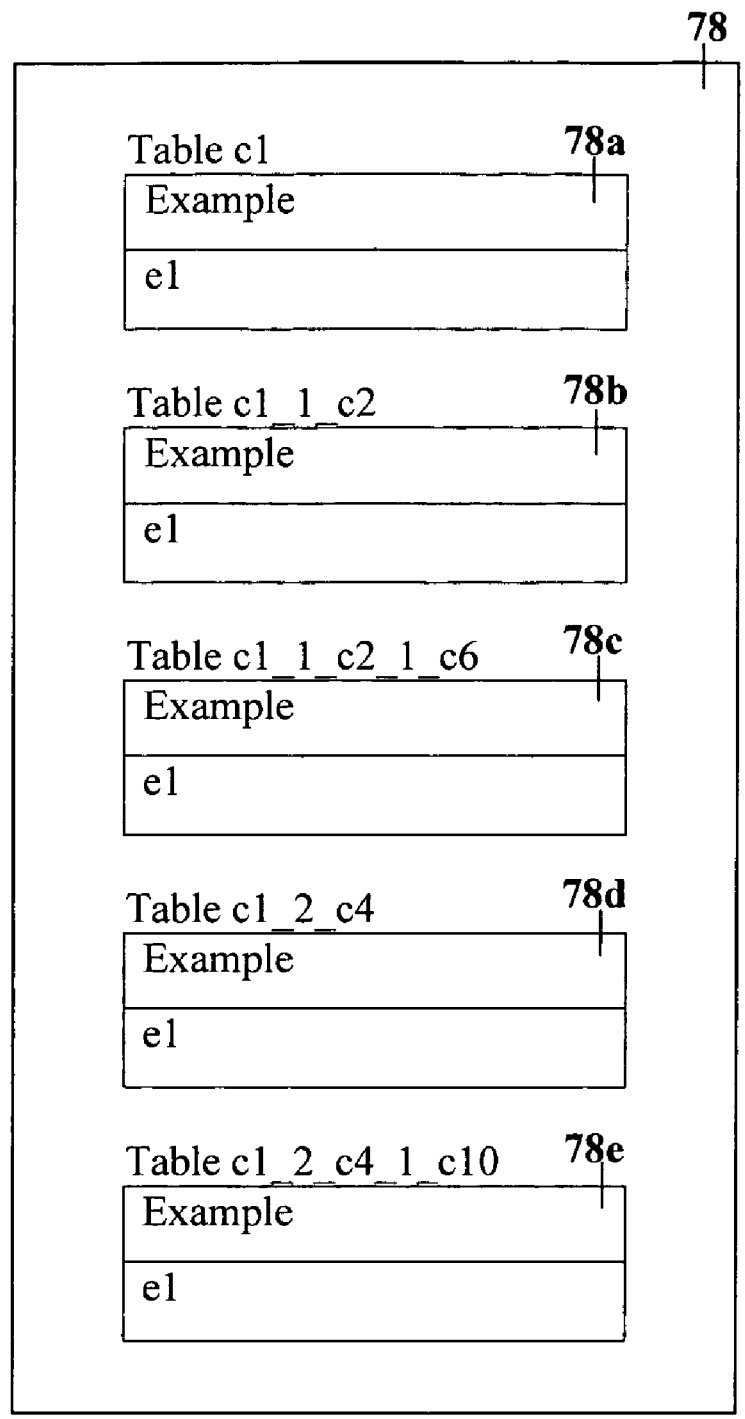
FIG. 9 is a group of database tables generated from a single proof tree according to the method of the present invention.

FIG. 9 shows a simplified table group 78 including database tables 78a, 78b, 78c, 78d, 78e generated from calling the process sequence under this assumption with the proof tree 40 in FIG. 3 together with the example label e1 and an initially empty set of tables. In this case, there is only one proof tree per example so the table group 78 may be simplified.

The queries that are generated by the process, as shown in FIG. 7, do not need to include the conditions that the tuples concerning a particular example also concern the same proof tree so that C can be used instead of C" when constructing the query in the process shown in FIG. 7, and hence C" does not need to be calculated in the process.

FIG. 10 shows the query 84 generated under this assumption from the partial proof tree shown in FIG. 6 for the example label e1.

FIG. 11 shows that the procedure may be extended for handling special predicates. Besides predicates that are built into the system for generating proof trees, such as =/2 mentioned earlier, that should not be included in the proof trees when used together with the coverage check procedure, there may also be some special predicates that cannot be excluded from the proof trees. These predicates are such that they may be resolved upon, but the clauses to use are not included in the logical theory, and their exact appearance depends on values derived from the examples. An example of such a special predicate is split_number/1, which is used in a logical theory 86 that includes two occurrences of this predicate 87, 89, one for each argument (Weight, Length). The purpose of this predicate is to allow values derived from the examples to act as boundaries when dividing the range for the corresponding numeric variable into two intervals so that one interval is excluded.

Figures 12, 13:
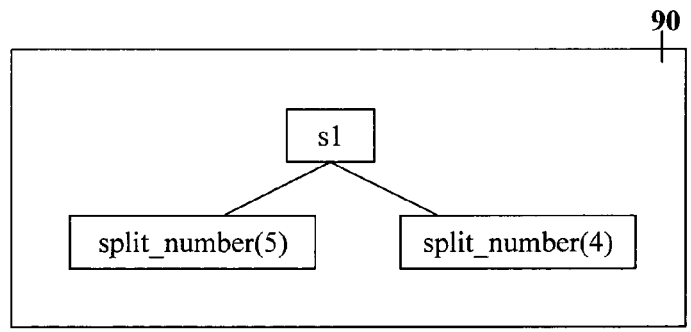
FIG. 12 is a rule according to the method of the present invention.
FIG. 13 is a schematic flowchart of a proof tree of the method of the present invention.

FIG. 12 shows a rule 88 that can be obtained in two steps from the clause in FIG. 11. The above procedure can be extended to deal with such special predicates in the following way. Values for the special predicates are included in leaves of the partial proof trees.

FIG. 13 shows a proof tree 90 of the example reward (5,4) given the logical theory 86 in FIG. 11. When transforming a proof tree into a set of database tables using the process sequence in FIG. 4, a table generated from a sequence that ends in a leaf that contains values for a special predicate, requires extra fields (e.g., "split_number" column) and the tuple added to the table should contain the corresponding values for these fields.

FIG. 14 shows a group of tables 92 generated for the above example when having made this modification to the process sequence in FIG. 4. When having obtained a rule by resolving upon some special predicate, the conditions on the values that are introduced during these resolution steps must also be added when using the process sequence shown in FIG. 7 to generate a database query.

FIG. 15 shows a database query 96 obtained from the rule 88 shown in FIG. 12.

While the present invention has been described in accordance with preferred compositions and embodiments, it is to be understood that certain substitutions and alterations may be made thereto without departing from the spirit and scope of the following claims.

The invention claimed is:

1. A method used in a computer, comprising:
providing a logical theory having clauses;
providing a rule that has been derived from the clauses in the logical theory, and for which derivation of the rule is provided in form of a partial proof tree having nodes;
providing a set of examples;
providing derivations of the examples from the clauses in the logical theory in a form of proof trees;
transforming each proof tree into a database of a coverage check apparatus using a first process sequence;
transforming the partial proof tree into a database query of the coverage check apparatus using a second process sequence; and
executing the query to identify tuples in the database that correspond to the nodes of the partial proof tree.

2. The method according to claim 1 wherein the method further comprises determining whether the partial proof tree is identical to a portion of the proof tree.

3. The method according to claim 1 wherein the method further comprises investigating for each rule and each example whether the rule covers the example.

4. The method according to claim 3 wherein the method further comprises investigating whether a condition part of the rule is satisfied by the example.

5. The method according to claim 1 wherein the method further comprises making the partial proof tree more limiting than the logical theory.

6. The method according to claim 1 wherein the method further comprises concluding that the rule does not cover the example when tuples that correspond to the nodes of the partial proof tree cannot be identified in the database.

7. The method according to claim 6 wherein the method further comprises concluding that the rule does cover the example when tuples that correspond to the nodes of the partial proof tree can be identified in the database.

8. The method according to claim 1 wherein the method further comprises determining whether the tuples identified in the database are associated with a single example.

9. The method according to claim 1 wherein the method further comprises using the logical theory to describe all possible rules that may be created.

10. The method according to claim 1 wherein the method further comprises determining whether or not the query gives an empty result.

* * * * *